(12) United States Patent
Weber

(10) Patent No.: US 7,915,754 B2
(45) Date of Patent: Mar. 29, 2011

(54) ISOLATING SWITCH SYSTEM

(75) Inventor: Norbert Weber, Neidenbach (DE)

(73) Assignee: Deere & Company, Moline, IL (US)

( * ) Notice: Subject to any disclaimer, the term of this patent is extended or adjusted under 35 U.S.C. 154(b) by 429 days.

(21) Appl. No.: 11/992,935

(22) PCT Filed: Sep. 14, 2006

(86) PCT No.: PCT/EP2006/066357
§ 371 (c)(1), (2), (4) Date: Apr. 1, 2008

(87) PCT Pub. No.: WO2007/039427
PCT Pub. Date: Apr. 12, 2007

(65) Prior Publication Data
US 2009/0223784 A1 Sep. 10, 2009

(30) Foreign Application Priority Data

Oct. 1, 2005 (DE) .......................... 10 2005 046 569

(51) Int. Cl.
*H01H 27/00* (2006.01)
*H02J 13/00* (2006.01)

(52) U.S. Cl. ..................... 307/10.6; 307/10.1; 307/9.1

(58) Field of Classification Search .................. 307/1–8, 307/9.1–10.8
See application file for complete search history.

(56) References Cited

U.S. PATENT DOCUMENTS

| | | | | | |
|---|---|---|---|---|---|
| 3,769,519 | A | * | 10/1973 | Adamian | 307/10.8 |
| 3,963,940 | A | * | 6/1976 | Adamian | 307/10.8 |
| 4,733,100 | A | * | 3/1988 | Nusairat et al. | 307/9.1 |
| 4,905,115 | A | * | 2/1990 | Whidden et al. | 307/10.7 |
| 5,834,854 | A | * | 11/1998 | Williams | 307/10.6 |
| 5,903,063 | A | * | 5/1999 | Blaker | 307/10.1 |

\* cited by examiner

*Primary Examiner* — Fritz M Fleming

(57) ABSTRACT

The invention relates to an isolating switch system. The isolating switch system includes an isolating switch for interrupting a main line running between an electric power source and an electric consumer. The isolation switch is controlled in dependence on an ignition switch. The isolating switch system includes a signal generating unit, a signal detector unit and a signal processing unit. The signal generating device generates an electric signal that can be fed to the electric consumer and conducted to the ignition switch. The electric signal, in dependence on a switching state of the ignition switch can be conducted to the signal detector unit via a conduction path. The signal processing unit, upon detection of the electric signal, causes the isolation switching system to open or close the main circuit line. The electric signal generated by the signal generating unit is a pulsed signal.

9 Claims, 1 Drawing Sheet

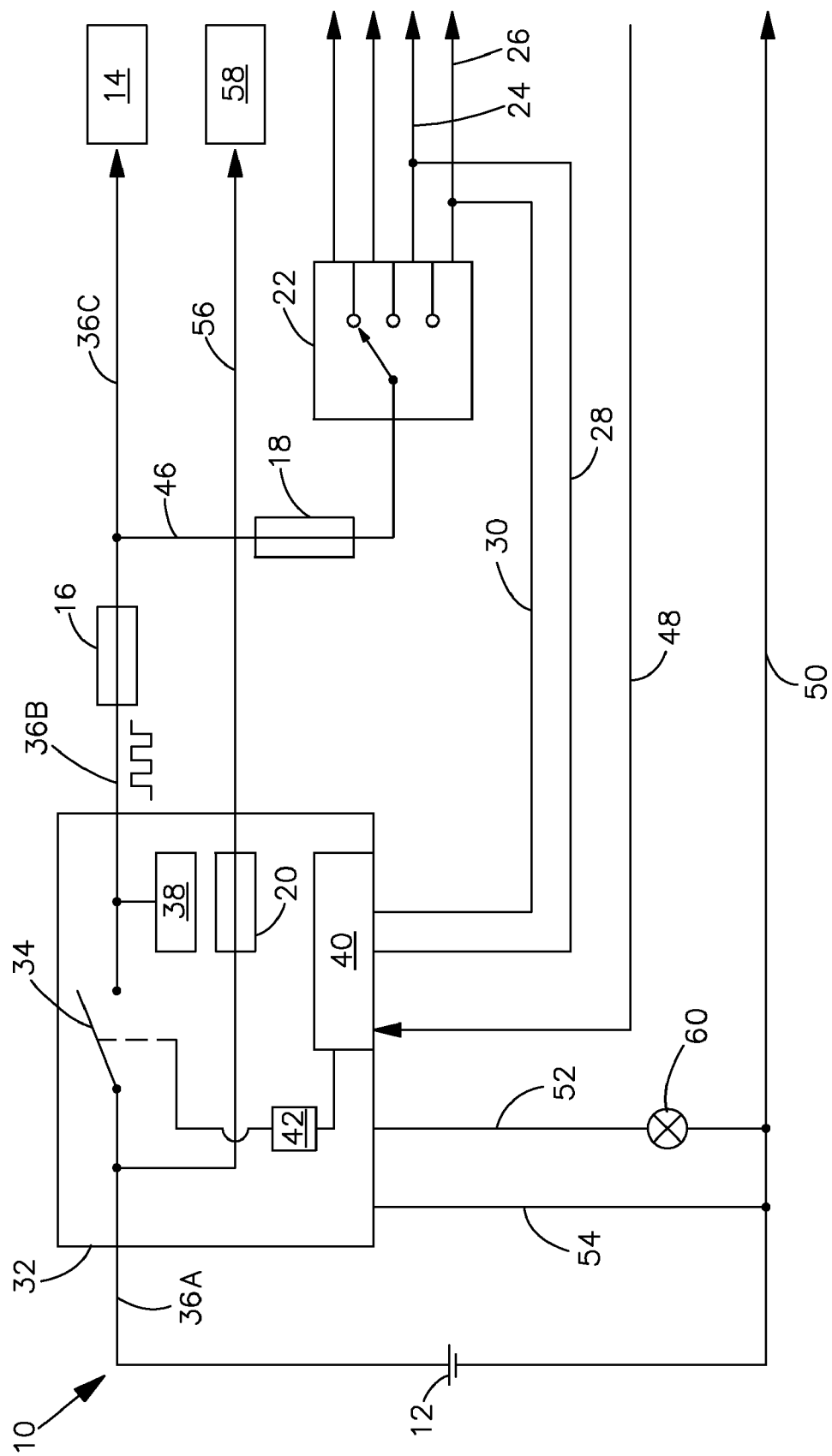

ISOLATING SWITCH SYSTEM

FIELD OF THE INVENTION

This invention relates to an isolating switch system for isolating an electric circuit of a motor vehicle from an electric power source, preferably for isolating an electric DC circuit from a vehicle battery.

BACKGROUND OF THE INVENTION

Isolating switch systems for isolating an electric circuit of a motor vehicle from an electric power source are known and are specifically designed for a variety of uses. For example, there are known isolating switch systems in which a main line of the vehicle electric circuit is interrupted by pyrotechnic means in case of an accident. There are also known manually activated switches or isolating relays with a manually activated switch, with which a main line of a vehicle electric circuit can be interrupted.

EP 0 410 617 A2 shows an electronically controlled isolating switch system for controllably interrupting a main line between an electric power source and a consumer. This isolating switch system can be controlled as a function of the ignition switch of the vehicle.

However, for this the electric switching must be designed so that the electric circuit line is provided from the ignition switch of the vehicle to the isolating switch system, with which an appropriate control of the isolating switch system takes place. Subsequent integration of such an isolating ignition switch in accordance with EP 0 410 617 A2 into an existing electric circuit of a vehicle is therefore only possible when such a connecting line is incorporated between the ignition switch and the isolating switch system together with the isolating switch. However, this is complicated and cost-intensive.

SUMMARY OF THE INVENTION

Accordingly, an object of this invention is to provide an isolating switch system which overcomes the above problems.

A further object of the invention is to provide an existing vehicle electric circuit with an isolating switch system as simply and cheaply as possible.

These and other objects are achieved by the present invention, wherein an isolating switch system has a signal generation unit, a signal detector unit and a signal processing unit. An electric signal that can be fed into the electric circuit and conducted via a circuit path of the electric circuit to the ignition switch can be generated with the signal generation unit. Depending on the switching state of the ignition switch, the electric signal can be conducted to the signal detector unit via one conduction path, possibly other conduction paths, of the electric circuit. Thus, if the electric circuit reaches the signal detector unit via a conduction path, it can be detected by the signal detection unit. With the signal processing unit, depending on detection of the electric signal, the main line running between the electric current source and the minimum of one consumer can be interrupted or closed by the isolating switch.

Such an isolating switch system, for an ignition switch of a motor vehicle, can be controlled even without an extra electric line, if specifically the isolating switch system is designed so that it feeds an electric signal to the electric circuit of the motor vehicle and that the switching state of the ignition switch can be detected with the isolating switch system on the basis of detection of the signal. Thus, the already existing conduction connections of the electric circuit of the motor vehicle are utilized for sending/receiving the electric signal, so that in a really especially advantageous way no separate electric line is specified for this purpose. Accordingly, the electric circuit of the motor vehicle can be more simply designed and uncomplicated and rapid integration or provision of an already existing electric circuit of a motor vehicle with an isolating switch system is possible.

Specifically, the ignition switch could have an ignition lock activated with an ignition key. Alternatively, it is also conceivable for the ignition switch to have a switching unit that is operated by an identification device. Such a ignition switch is used in particular in motor vehicles of the latest generation, and is formed, for example, by an electrically activated closing switch, which can be activated according to purpose when an appropriate identification means is read by a reading device provided for this. The identification device can interact, for example, with an identification means based on a chip card module or a transponder or RFID.

Preferably, the electric signal generated by the signal generation unit is pulsed. Various pulse shapes and pulse frequencies are possible. In general, the electric signal have a low voltage. The electric signal generated by the signal generation unit may be superimposed on an AC voltage or a DC voltage. At any rate, the electric signal is formed so that interference of electric components provided in the vehicle or in the electric circuit is not possible or is at least largely precluded.

Preferably, the signal detector unit is connected to at least one circuit line of the electric circuit. A specific signal that is generated by an appropriate component of the vehicle electrics is conducted by such a circuit line. The actually existing operating state of the vehicle can be derived from this specific signal. If the signal detector unit is connected to at least two circuit lines, the signal detector unit could be designed so that it is also possible to detect the line via which the electric signal is detected. Specifically, the signal detector unit could be connected with the circuit lines "start" and/or "ignition" of the electric circuit and thus could detect the specific signals "start" and "ignition". Another example of a specific signal is the electric signal generated by an alarm system. The corresponding electric signals for starting and for ignition of the vehicle are then available either where the isolating switch system is to be integrated into the electric circuit or the isolating switch system is built in at an appropriate site in the electric circuit, where such electric signals are available.

The conduction path via which the electric signal can be conducted to the electric circuit could be an electric circuit line or nearly all electric circuit lines of the electric circuit and/or an electrically conductive part of the body of the vehicle.

The electric current source is preferably a vehicle battery.

Preferably, the isolating switch system is a modular assembly. This modular assembly could have an electric interface for connection to the electric circuit, and could have a circuit board.

The isolating switch system could be provided with its own small current source, for example, a battery or accumulator. However, the isolating switch system is preferably designed so that the electric components of the isolating switch system are powered from the power source of the electric circuit of the vehicle. Thus, the isolating switch system takes the electric energy necessary to generate, send and receive the electric signal and to activate the isolating switch from the electric circuit itself, or the power source of the electric circuit.

Preferably, at least one electric circuit line of the electric circuit that connects the power source to at least one electric consumer is provided, where such a circuit line cannot be interrupted by the separating switch. This in particular concerns electric circuit lines that are designed for low voltages or currents and which connect the power source of the electric circuit, for example, to a clock, radio or a vehicle controller provided in a vehicle.

Preferably, the isolating switch of the isolating switch system can be controlled in dependence on the detection of more than one electric signal. Thus, the control of the isolating switch is made dependent, for example, on detection of the electric signal that is generated by the signal generation unit, and the detection of another electric signal, for example, the "ignition" signal. Another example is the use of an electric signal that is generated by an alarm system of the vehicle. If this signal is present, thus the alarm system has been triggered, the isolating switch could be opened, so that the vehicle cannot be started and through this ultimately immobilization of the vehicle is realized.

Thus, the isolating switch system in accordance with the invention essentially has the following advantages: Simple integration into any vehicle is possible. No change of existing vehicle electrics or an existing electric circuit is necessary. No additional sensors and control units are necessary. Automatic control of the isolating switch system takes place independently of a driver or owner of the vehicle. A manual switch, that is especially provided to isolate a main circuit line running between the electric power source and at least one user is no longer necessary. Control of the isolating switch system in dependence on the ignition lock is possible without an electric circuit line especially provided for this. And, a new ignition lock with an additional independent contact is not necessary.

BRIEF DESCRIPTION OF THE DRAWINGS

The sole FIGURE is a schematic diagram of an isolating switch system in accordance with the invention, which is integrated into an electric circuit of a motor vehicle.

DESCRIPTION OF THE PREFERRED EMBODIMENT

The sole FIGURE shows in a schematic representation a part of the electric circuit 10 of a motor vehicle (not shown). The electric circuit 10 includes a vehicle battery 12 for supplying electrical power to electric consumers 14. Basically all consumers could be electric consumers, in particular the starter of the vehicle, the starter circuit, or the compressor of an air-conditioner (not shown). Circuit 10 also includes a main fuse 16, a backup fuse 18 and an electronic fuse 20.

The switch 22 is an ignition switch. The motor vehicle can be started or switched off with the ignition switch 22. Accordingly, an electric connection can be made between the vehicle battery 12 and, for example, the starter components of the vehicle (not shown) with the switch 22. Specifically, the signal "ignition" is to be used preferably. Dependence on one or more signals is possible. The circuit lines 28 and 30 run from circuit lines 24 and 26 to the isolating switch system 32.

The isolating switch system 32 includes an electrically activated isolating switch 34, with which the main conducting line 36A, 36B can be interrupted or closed.

According to the invention, the isolating switch system 32 has a signal generating unit 38, a signal detection unit 40 and a signal processing unit 42. Signal generating unit 38 preferably generates a pulsed electric signal which is fed to the electric circuit 10 via the main circuit line 36B.

Accordingly, the electric signal can return to the isolating switch system 32 via the conduction path that is formed by the further course of circuit line 36C to the electric consumers 14 and optionally via the control signal circuit line 48 or circuit lines 50, 52, 54. Alternatively, and in dependence on the position of switch 22, the electric signal can go via the conduction path to the isolating switch system 32 and back to the detector device 40, where the conduction path is formed via the circuit lines 36B and 46, switch 22 and either via circuit lines 24 and 28 or via circuit lines 26 and 30. It is also possible that the electric signal sent by the signal generating unit 38 does not go back to the isolating switch system 32, because individual components of the electric circuit 10, especially switch 22, do not make an electric conduction connection or conduction path between the signal generating unit 38 and the signal detector unit 40. However, if such a conduction path exists, the electric signal from the signal detector unit 40 can be detected.

The signal detection unit 40 is designed to detect the pulse signal and to determine from which electric circuit line the pulse signal is detected. The signal detector unit 40 in turn generates a signal which is transmitted to the signal processing unit 42. Depending on whether a pulsed signal was detected or not, or from which conduction path the pulsed signal was detected, the isolating switch 34 is switched. The isolating switch 34 could be a traditional relay, for example. Thus, depending on the switch position or switching state of switch 22, the isolating switch 34, can be switched without a direct circuit line connection between the switch 22 and the isolating ignition switch 32 being necessary. The signal generating unit 38, the signal detector unit 40, and the signal processing unit 42 are shown as separate parts. Alternatively, these three parts could also be one electric unit assembled into an assembly.

The vehicle battery 12 is always connected via circuit line 56 to other electric consumers 58. Accordingly, the electric consumers 58 are supplied with electric current from the battery 12 regardless of the switching position of isolating switch 34. The electric consumers 58 are an automobile radio, one or more controllers for control of individual vehicle components (for example, the combustion engine or the transmission). Reference number 60 indicates a control indicator.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

The invention claimed is:

1. An isolating switch system for isolating a vehicle starter from an electric power source in a vehicle electric circuit, the isolating switch system comprising:
   an isolating switch for interrupting a main circuit line connecting the electric power source to the vehicle starter;
   a signal generating unit feeding an electrical signal to an ignition switch by means of a first conduction path, the ignition switch in turn feeding the electrical signal to a signal detector unit by means of a second conduction path dependent on a switching state of the ignition switch; and
   a signal processing unit closing the isolating switch upon detection of the electrical signal by the signal detector unit.

2. The isolating switch system of claim 1, wherein:
   the electric signal generated by the signal generating unit is a pulsed signal.

3. The isolating switch system of claim 1, wherein:
the signal detector unit is connected to a plurality of circuit lines and the signal detector unit determines upon which of said plurality of circuit lines the electric signal is detected.

4. The isolating switch system of claim 3, wherein:
the signal detector unit is connected to a start circuit line and to an ignition circuit line.

5. The isolating switch system of claim 1, wherein:
the conduction path comprises an electric line or an electrically conductive part of the vehicle.

6. The isolating switch system of claim 1, wherein:
the electric power source comprises a battery.

7. The isolating switch system of claim 1, wherein:
the power source supplies electric power to components of the isolating switch system.

8. The isolating switch system of claim 1, wherein:
a further electric consumer is connected to the power source by an electric circuit line which cannot be interrupted by the isolating switch.

9. The isolating switch system of claim 1, wherein:
the isolating switch is controlled in dependence on an alarm signal.

\* \* \* \* \*